(12) United States Patent
Jeyapaul et al.

(10) Patent No.: US 11,934,272 B2
(45) Date of Patent: Mar. 19, 2024

(54) CHECKPOINT SAVING

(71) Applicant: Arm Limited, Cambridge (GB)

(72) Inventors: Reiley Jeyapaul, Austin, TX (US); Roxana Rusitoru, Cambridge (GB); Jonathan Curtis Beard, Austin, TX (US); Kar-Lik Kasim Wong, London (GB)

(73) Assignee: Arm Limited, Cambridge (GB)

( * ) Notice: Subject to any disclaimer, the term of this patent is extended or adjusted under 35 U.S.C. 154(b) by 19 days.

(21) Appl. No.: 17/742,875

(22) Filed: May 12, 2022

(65) Prior Publication Data

US 2023/0367676 A1  Nov. 16, 2023

(51) Int. Cl.
*G06F 11/14* (2006.01)

(52) U.S. Cl.
CPC .............. *G06F 11/1407* (2013.01)

(58) Field of Classification Search
CPC .................................................. G06F 11/1407
See application file for complete search history.

(56) References Cited

U.S. PATENT DOCUMENTS

| | | | |
|---|---|---|---|
| 9,424,142 B2* | 8/2016 | Ljubuncic | G06F 11/3017 |
| 10,325,108 B2* | 6/2019 | Li | G06F 21/6218 |
| 10,423,446 B2 | 9/2019 | Dunham et al. | |
| 10,552,212 B2 | 2/2020 | Dunham et al. | |
| 10,552,274 B1* | 2/2020 | Zhao | G06F 11/2082 |
| 10,671,426 B2 | 2/2020 | Dunham et al. | |
| 10,613,989 B2 | 4/2020 | Rusitoru et al. | |
| 10,705,914 B2* | 7/2020 | Zhao | G06F 9/545 |
| 2010/0037096 A1 | 2/2010 | Bum et al. | |
| 2015/0032962 A1 | 1/2015 | Buyuktosunoglu et al. | |

FOREIGN PATENT DOCUMENTS

WO   2007/031696   3/2007

OTHER PUBLICATIONS

International Search Report and Written Opinion of the International Searching Authority for PCT/GB2023/050376 dated May 19, 2023, 13 pages.

* cited by examiner

*Primary Examiner* — Joseph R Kudirka
(74) *Attorney, Agent, or Firm* — NIXON & VANDERHYE P.C.

(57) ABSTRACT

An apparatus comprises at least one processor to execute software processes, a memory system to store data for access by the at least one processor, and checkpointing circuitry to trigger saving, to the memory system, of checkpoints of context state associated with at least one software process executed by the at least one processor. The saving of checkpoints is a background process performed by the checkpointing circuitry in the background of execution of the software processes by the at least one processor.

19 Claims, 6 Drawing Sheets

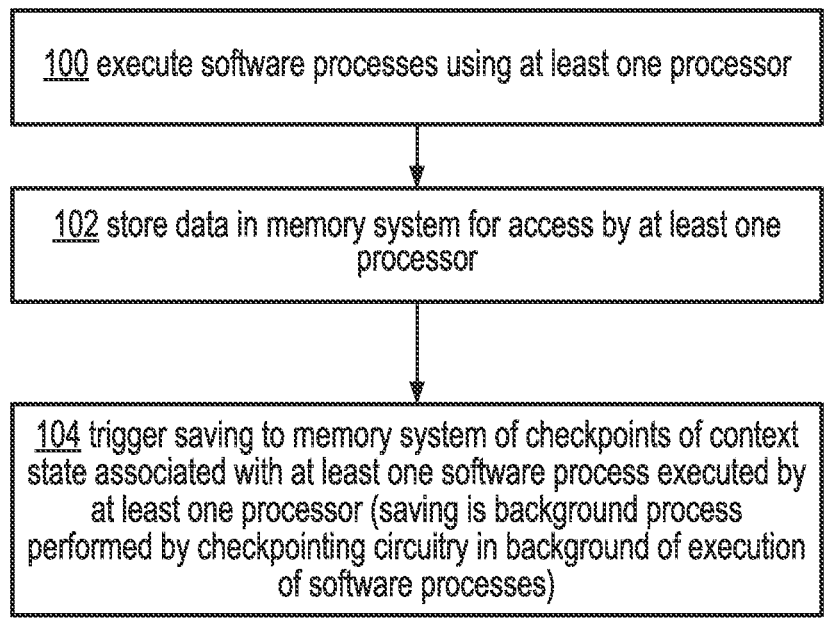
FIG. 4
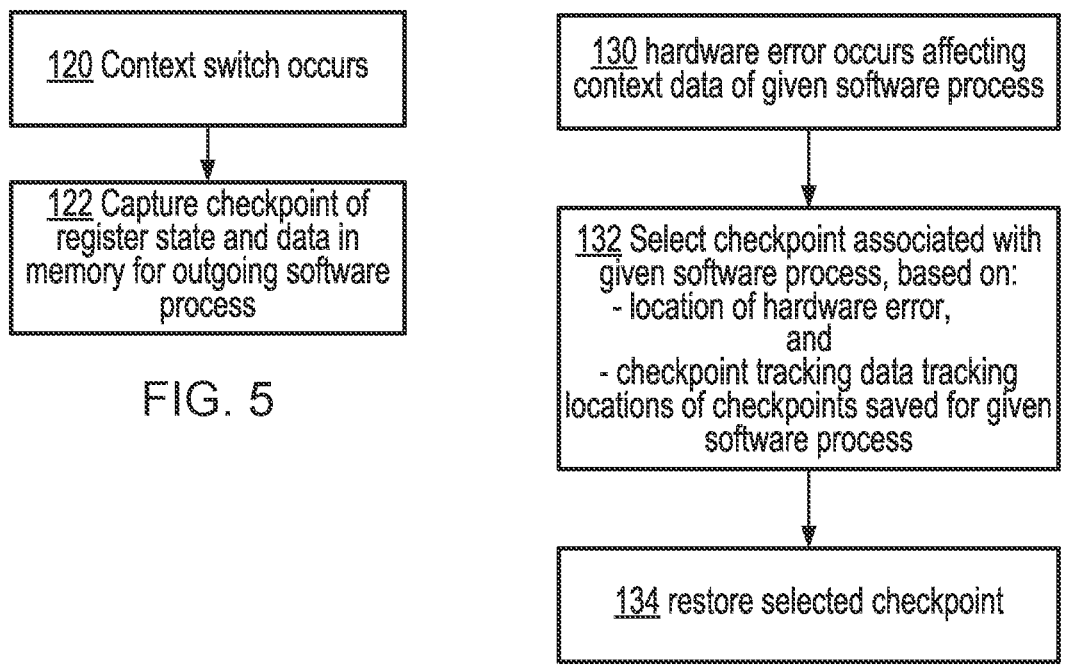
FIG. 5
FIG. 6

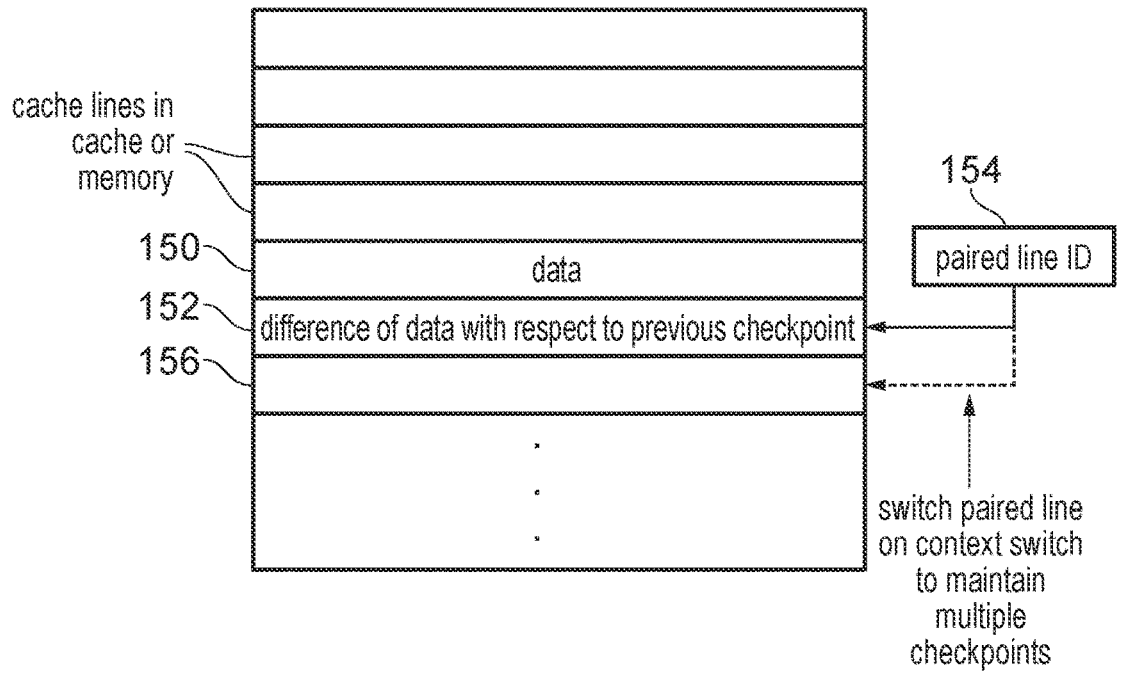
FIG. 7
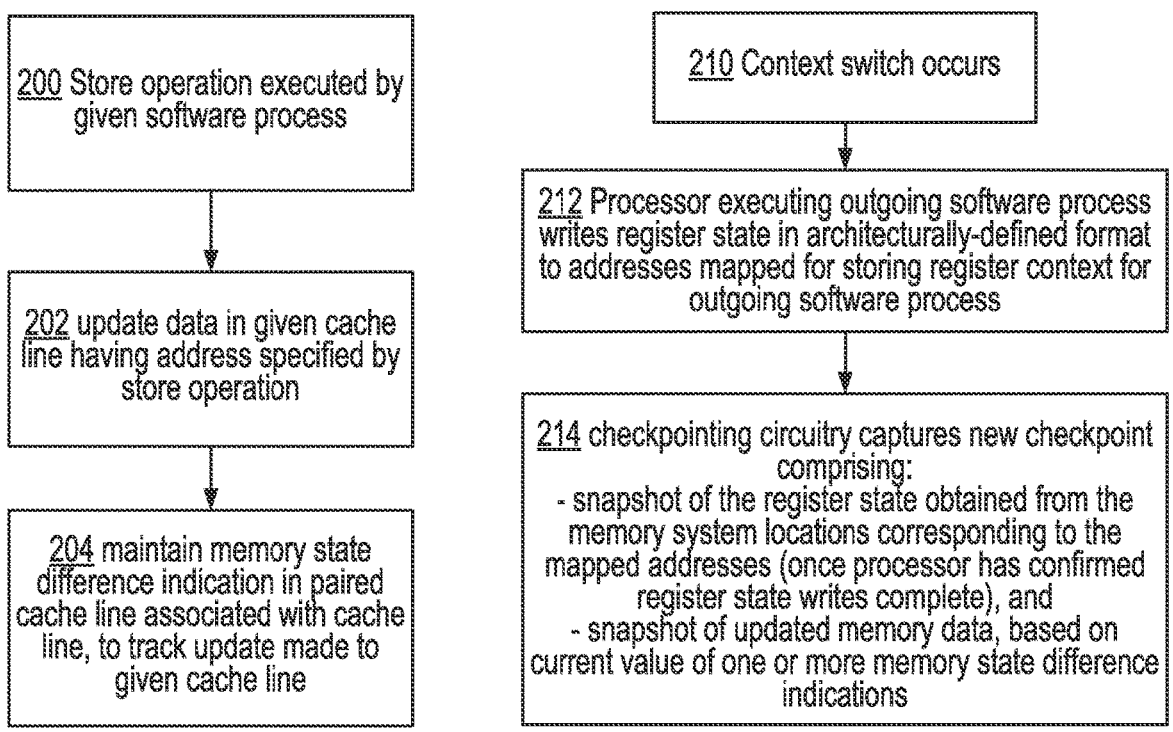
FIG. 8
FIG. 9

CHECKPOINT SAVING

BACKGROUND

Technical Field

The present technique relates to the field of data processing.

Technical Background

To improve fault tolerance in a data processing system comprising one or more processors, it can be useful to save checkpoints of context state associated with at least one software process executed by the processors. If a failure in a component of the data processing system causes corruption of the context state associated with the software process, a previously saved checkpoint can be restored.

SUMMARY

At least some examples of the present technique provide an apparatus comprising:
  at least one processor to execute software processes;
  a memory system to store data for access by the at least one processor; and
  checkpointing circuitry to trigger saving, to the memory system, of checkpoints of context state associated with at least one software process executed by the at least one processor; in which:
  said saving of checkpoints is a background process performed by the checkpointing circuitry in the background of execution of the software processes by the at least one processor.

At least some examples of the present technique provide a method comprising:
  executing software processes using at least one processor;
  storing data in a memory system for access by the at least one processor; and
  triggering saving, to the memory system, of checkpoints of context state associated with at least one software process executed by the at least one processor; in which:
  said saving of checkpoints is a background process performed by checkpointing circuitry in the background of execution of the software processes by the at least one processor.

At least some examples of the present technique provide a computer-readable medium to store computer-readable code for fabrication of an apparatus comprising:
  at least one processor to execute software processes;
  a memory system to store data for access by the at least one processor; and
  checkpointing circuitry to trigger saving, to the memory system, of checkpoints of context state associated with at least one software process executed by the at least one processor; in which:
  said saving of checkpoints is a background process performed by the checkpointing circuitry in the background of execution of the software processes by the at least one processor.

Further aspects, features and advantages of the present technique will be apparent from the following description of examples, which is to be read in conjunction with the accompanying drawings.

BRIEF DESCRIPTION OF THE DRAWINGS

FIG. 4 illustrates a method including saving of checkpoints;

FIG. 5 illustrates steps performed in response to a context switch;

FIG. 6 illustrates steps performed in response to occurrence of a hardware error affecting context data for a given software process;

FIG. 7 illustrates use of a paired cache line to maintain a memory state difference indication for indicating updates made to data stored in another cache line;

FIG. 8 illustrates steps performed in response to a store operation executed by a given software process;

FIG. 9 illustrates another example of steps performed in response to a context switch;

DESCRIPTION OF EXAMPLES

Figure 1:
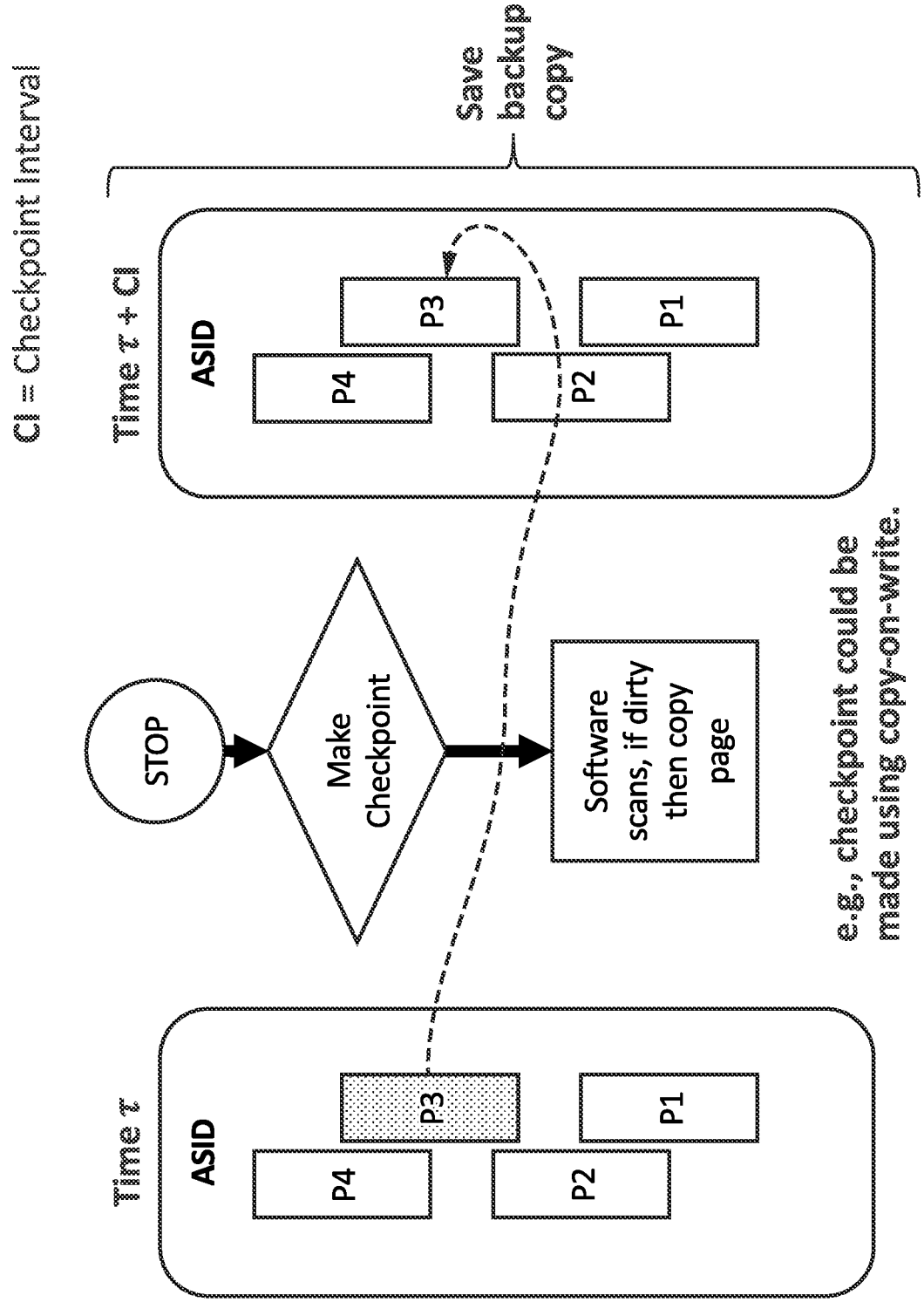
FIG. 1 illustrates, for comparison, stop-based checkpointing where software-managed saving of checkpoints is performed by a checkpointing software routine which interrupts the processing of other software processes.

An apparatus has at least one processor to execute software processes, a memory system to store data for access by the at least one processor, and checkpointing circuitry to trigger saving, to the memory system, of checkpoints of context state associated with at least one software process executed by the at least one processor. The saving of checkpoints is a background process performed by the checkpointing circuitry in the background of execution of the software processes by the at least one processor.

The saving of checkpoints helps to provide fault tolerance by enabling recovery in the presence of a fault affecting the context state of a given software process, so that the given software process is not affected by the error caused by the fault and continue to make forward progress based on the restored context state. By saving checkpoints to the memory system, which may generally be accessible for data access by at least one processor in response to load/store instructions executed in software processes, it becomes practical to save checkpoints for a much larger number of software processes and time points than would be practical if saving checkpoints to dedicated hardware storage within a processor. Hence, the checkpoint scheme can be scalable to varying number of processors in the system, varying number of threads running on the processors, and varying time granularity of capturing checkpoints, for example. However, typical schemes for saving checkpoints to the memory system rely on stopping the execution of the software processes of interest and running a checkpointing software routine which is responsible for capturing the context state for a given software process and saving it to memory. This impacts the performance available for the software processes themselves, especially if fine-grained checkpointing is desired where the checkpoints are captured at relatively short time intervals.

In the examples discussed below, checkpointing circuitry is provided, coupled to the memory system, to trigger saving to the memory system checkpoints of context state associated with at least one software process. The saving of checkpoints is a background process performed by the checkpointing circuitry in the background of execution of the software processes being executed by the at least one processor. Therefore, there is no need to interrupt execution of the software processes to allow for checkpointing, and the software process can continue to execute while the checkpointing circuitry manages the saving of checkpoints (e.g. for a previously executing software process) in the background. Therefore, the performance cost of implementing the checkpointing can be greatly reduced.

There can be a variety of ways in which the checkpointing circuitry could be implemented. In one example, the checkpointing circuitry comprises hardware circuit logic configured to perform hardware-managed saving of checkpoints. This means there is no need for software control of the checkpoint saving processing. The hardware can trigger the required saving operations without direct involvement of software (although the hardware could still operate based on configuration information set by software).

Another approach is that the checkpointing circuitry could comprise a further processor or microcontroller, separate from the at least one processor executing the software processes (contexts) whose context state is being checkpointed. The further processor or microcontroller can execute checkpointing firmware or software which manages the saving of checkpoints. As the checkpointing firmware or software runs on a separate processor or microcontroller from the at least one processor running the software processes being checkpointed, the checkpointing firmware/software can operate in the background of the software processes and so there is no need to stop the software processes from executing to allow the checkpoints of the context state of those software processes to be taken. In this case, the memory accesses for saving/restoring checkpoints may be triggered by a request from the firmware or software executing on the further processor or microcontroller.

The checkpointing circuitry may comprise memory access circuitry capable of initiating, unprompted by a memory access request made by software executing on the at least one processor, a memory access request requesting a read, write or transfer of data at a given location of the memory system. For example, the checkpointing circuitry could comprise an independent structure or upgraded memory controller which is coupled to the memory system network traffic and has the ability to trigger the generation of checkpoints at various time intervals without needing an explicit software trigger from a software process running on the at least one processor, or could comprise the further processor or microcontroller mentioned above. While software may set configuration information which controls how the checkpointing circuitry functions, the capture of an individual checkpoint does not need explicit software intervention from the software processes being checkpointed.

The hardware circuit logic for the checkpointing circuitry could be a single hardware unit or could be distributed circuit logic which includes circuit logic implemented at a number of different locations in the system. For example, the distributed circuit logic could include some circuit logic local to a cache of a given processor, as well as some circuit logic within the memory system fabric and/or a memory controller coupled to a memory system bus. In general, by providing hardware circuit logic which is capable of initiating checkpoint saving without requiring explicit software instructions to be executed to direct the data transfer operations for saving the checkpoint, this reduces the impact on performance achieved for the software processes being executed by the at least one processor.

The checkpointing circuitry may maintain tracking data indicative of one or more locations at which checkpoints of context state are stored for a given software process. Hence, as well as being responsible for the capture of checkpoints, the checkpointing circuitry may also be responsible for maintaining a record of the memory addresses at which various checkpoints of context data stored, so that an appropriate checkpoint can be selected for restoration if necessary. The tracking of the locations at which checkpoints are stored can be performed in hardware which does not need explicit software-triggered updates of the tracking data structure, or could be performed by firmware/software executing on a further processor or microcontroller as mentioned above. The tracking data structure could be stored in dedicated hardware storage circuitry (e.g. a set of registers maintained by the checkpointing circuitry), or could be a memory-based data structure stored in the memory system, accessed using a selected set of addresses within the address space mapped for use by the checkpointing circuitry. For example, the checkpointing circuitry could include a register that can be programmed with an address to be used for accessing the checkpoint tracking data structure. Use of a memory-based tracking data structure can be helpful to enable the checkpointing circuitry to be scalable to varying numbers of processors and numbers of software processes executing on the processors.

The checkpointing circuitry may restore a given checkpoint in response to a hardware error signal indicating occurrence of a hardware error. For example, the hardware error may be a RAS (Reliability, Availability and Safety) error indicating an event which has caused a certain hardware component to fail, so that context state may have become corrupted. For example, the hardware error could be a single event upset (bit flip) caused by a cosmic ray, ionizing particle or other background radiation striking a flip-flop, latch or other data storage element, which can cause one or more bits of stored state to flip value from 0 to 1 or 1 to 0, corrupting the stored data. Bit flips could also occur due to electrical interference, cross-talk, or other causes. Other types of hardware fault include deterioration of electronic components with time due to electromigration or other effects. Hardware errors could be detected using techniques such as error detecting codes or error correcting codes, or by providing redundant components which may operate in lockstep. Such hardware errors may be events which cause the hardware to behave incorrectly (contrary to the correct behaviour as designed by the designer). Such hardware errors may be distinguished from other types of errors such as speculation errors when the hardware making a speculative prediction about program execution outcomes incorrectly predicts the behaviour for a future event, and so has to flush incorrectly executed instructions and resume execution from a point of program flow before the speculation error occurred (in such speculation errors, the hardware has behaved correctly according to the intended behaviour specified by the system designer, but the error arose because the program behaviour changed compared to the previous behaviour used to form the prediction).

The checkpointing circuitry may trigger saving of a hierarchical set of checkpoints, the hierarchical set of checkpoints comprising two or more checkpoints at different time points, where the checkpointing circuitry controls the checkpoints to be stored to at least two different levels of memory system hierarchy. For example, the levels of memory system hierarchy may include one or more levels of cache, on-chip memory system storage (e.g. dynamic random access memory (DRAM)) and/or off-chip memory system storage. By storing multiple checkpoints corresponding to different time points of software execution, and storing those checkpoints in at least two different levels of the memory system hierarchy, this improves fault tolerance because if a hardware error affects a given level of the memory system hierarchy, it is more likely that an error-free checkpoint can be recovered based on a checkpoint stored in another level of the memory system hierarchy.

The checkpointing circuitry may maintain the hierarchical set of checkpoints to store a checkpoint corresponding to a less recent time point at a level of the memory system hierarchy which is slower to access than a level of the memory system hierarchy used to store a checkpoint corresponding to a more recent time point. Hence, the most recently captured checkpoints may be stored in the faster-to-access levels of the memory system hierarchy (such as in caches closer to the processor) while less recently captured checkpoints may be stored in slower-to-access levels of the memory system hierarchy (such as random access memory or off-chip storage). This approach has several advantages. Firstly, the most recent checkpoints are often the ones which would be most desirable to restore if an error occurs (if possible given the location at which the error occurred), as this reduces the amount of software execution that has to be replayed following restoration of the checkpoint, hence improving performance, and so making the most recent checkpoints accessible fastest can be helpful for performance. However, it can also be useful to maintain checkpoints for less recent timings in case more recently calculated state has become corrupted due to an error.

Maintaining the hierarchical set of checkpoints so that the most recent checkpoints are in faster-to-access levels of the memory hierarchy and less recent checkpoints gradually trickle down to slower-to-access levels of the memory system hierarchy can also be simpler to manage from the point of view the checkpointing circuitry. For example, the checkpointing circuitry may, in response to a checkpoint propagation trigger event, propagate at least one checkpoint to the next level of the memory system hierarchy (e.g. by triggering a cache writeback event, or an export of data from on-chip to off-chip memory, say). For example, the checkpoint propagation trigger event could be the elapse of a certain period of time, elapse of a number of processing cycles, elapse of a certain number of checkpoint capture events, elapse of a certain number of context switches between software processes, or the amount of remaining space in a higher level of the memory hierarchy available for checkpointing becoming less than a certain threshold. By periodically trickling down older checkpoints to the next level of the memory hierarchy to make space for more recently captured checkpoints, this enables the capture of fine-grained hierarchical set of checkpoints corresponding to a range of different time points during program execution which can be spread across the memory system to improve resistance to faults affecting different parts of the memory system.

In response to a checkpoint consolidation trigger event, the checkpointing circuitry may trigger a checkpoint consolidation operation to consolidate two or more checkpoints corresponding to different time points for a given software process, to form a consolidated checkpoint for the given software process. For example, a set of checkpoints for a number of different time points could be reduced to the checkpoint corresponding to a single one of those time points (e.g. the latest time in that set of time points). This approach can be particularly useful if the initially captured checkpoints are based on difference indications indicating differences compared to previously stored state (as described further below), in which case the checkpoint consolidation operation may consolidate the indicated differences for a given set of timepoints to form a consolidated checkpoint which indicates the absolute value of data to be restored if necessary in response to detection of a hardware error. The absolute value may be faster to restore than a set of difference indications. The checkpoint consolidation trigger event could be any of the types of events indicated for the checkpoint propagation trigger event above.

In some examples, the checkpointing circuitry may write the consolidated checkpoint to a level of the memory system hierarchy which is slower to access than a level of the memory system hierarchy used to store the two or more checkpoints that are combined to form the consolidated checkpoint. For example, the consolidated checkpoint may be written to the next level of the memory system hierarchy after the level which stored the plurality of checkpoints. Hence, in some cases the checkpoint propagation trigger event and the checkpoint consolidation trigger event may be the same event so that an occurrence of this event triggers both the consolidation of multiple checkpoints into a single combined checkpoint and the writing of that combined checkpoint to the next level of the memory system hierarchy, helping to trickle previously captured checkpoints down through the memory system as discussed above.

The checkpointing circuitry may capture checkpoints for a plurality of different software processes, each checkpoint associated with a process identifier indicative of a corresponding software process. The checkpointing circuitry may maintain a tracking structure tracking the locations (memory addresses) at which checkpoints are stored for each software process so that the process can recover from hardware errors affecting system components which store context state associated with that process.

In other examples, checkpointing could be performed for the system as a whole, rather than for individual processes, and in that case there is no need for checkpoints to be associated with individual processes. Instead, context state for a plurality of processes could be covered by a shared set of checkpoints.

Also, it is not essential for every software process executing on the apparatus to have its context state checkpointed. Some processes may not be considered necessary for checkpointing, e.g. because their data is not critical to reliability, availability or safety of the system. Therefore, in some examples the checkpoints may relate to only a subset of software processes executing on the apparatus.

A checkpoint for a given software process may comprise both register state and data stored to memory by the given software process. Hence, the checkpoint is not limited to register state, but may also include context data stored to memory. This can be useful because the execution context of a given software process may be larger than can fit within the set of architectural registers of a processor. Where the checkpoint includes data stored to memory for the given software process, that data may include data written to memory by architecturally-committed store operations of the given software process (that is, data written to memory by store instructions which have been resolved as correctly architecturally executed).

When a checkpoint captured for a given software process includes coherently stored data shared with another software process, restoring the checkpoint for the given software process may also make the coherently stored data available for the other software process. Hence, the checkpointing of state for one process can also benefit other processes which share access to the data.

The checkpoints could be captured at any time, including at relatively arbitrary time points not necessarily synchronized to a context switch timing.

However, in one example, in response to a context switch at a given processor to switch from processing a first software process to processing a second software process, the checkpointing circuitry may trigger saving of a new checkpoint for the first context. Triggering the saving of the new checkpoint following a context switch can be useful, because at a context switch the software executing on the given processor may in any case write register state to memory (to allow the processor's registers to be overwritten with state for the incoming second software process) and so the checkpointing circuitry may detect that register state writeback and use that to capture a new checkpoint. Also, context switches would often be expected to occur at relatively regular timings which can make the context switch event suitable for generating checkpoints.

In an example which captures checkpoints in response to a context switch, the checkpointing circuitry may use a hardware-exposed context switch signal to identify a timing at which the context switch occurs. Normally, context switches may be transparent to hardware circuit logic coupled to the memory system, so that the memory system may be unaware of which software processes executing at the processor or of the timings when a processor switches from one software process to another. However, to enable checkpointing circuitry within the memory system fabric to capture checkpoints in response to context switches using a background process managed in hardware, a mechanism may be provided to expose a context switch signal to the hardware so that the checkpointing circuitry may be aware of the timing of context switches. This signal could be implemented in different ways. In one example, the checkpointing circuitry may itself instruct the processor core to perform a context switch at certain time intervals, by sending the hardware-exposed context switch signal to the processor to trigger the processor to perform the context switch. In this case, the checkpointing circuitry may be directly responsible for triggering context switches between software processes executing at a given processor. Alternatively, a separate hardware unit responsible for controlling timing of context switches could issue the hardware-exposed context switch signal to both the processor to trigger the context switch and to the checkpointing circuitry to trigger a capture of a checkpoint. Another approach is that a processor may itself be responsible for determining the timings of context switches, and when a context switch occurs, the processor may transmit the hardware-exposed context switch signal to the checkpointing circuitry to inform the checkpointing circuitry that the context switch has occurred and so a checkpoint should be taken.

In some examples, context switches can be reported to the checkpointing circuitry using a context switch signal sent by the processor performing the context switch or a separate context-switch-triggering hardware unit, but the checkpointing circuitry may also have the ability to trigger a context switch by sending the hardware-exposed context switch signal to the processor core. One approach is to use a deadline-driven context switch timing where the checkpointing circuitry allows the processor or context-switch-triggering hardware unit to determine the context switch timings (e.g. at certain time intervals or triggered by software), but if the checkpointing circuitry determines that there has been no context switch within a certain period, then the checkpointing circuitry itself may issue the hardware-exposed context switch signal to the processor to trigger a further context switch (which could be a "dummy" context switch where the software process executed after the context switch is the same as the software process executing before the context switch), so that the checkpointing circuitry can ensure that checkpoints are taken at sufficiently regular time intervals. The dummy context switch may force saving of register state to the cache which can then be checkpointed by the checkpointing circuitry.

In an example which captures checkpoints in response to a context switch, to enable the checkpointing circuitry to capture the register state of the outgoing context (first software process), one approach could be to provide the checkpointing circuitry with direct access to the registers of the processor. However, in practice, this could be hard to implement while meeting circuit timings for the processing pipeline of the processor, and would require additional design effort to redesign processor circuit layout to accommodate the extra wiring to allow access by the checkpointing circuitry.

Hence, in some examples, it can be useful for the at least one processor, in response to the context switch, to save register state for the first software process, according to an architecturally-defined context saving format, to memory system locations corresponding to a mapped set of addresses mapped for storing the register state for the first software processes. The checkpointing circuitry can then obtain saved register state from the memory system locations corresponding to the mapped set of addresses, and use that saved register state to form the new checkpoint. Hence, by defining an architected context saving format, there is an understood protocol between the processor and the checkpointing circuitry so that the checkpointing circuitry can understand which memory addresses will be written with the stored register state for the first software process, and the checkpoint can be captured in such a way that the mapping between parts of the checkpoints and specific architectural registers is known, so that on a restoration the corresponding registers can be restored with the context state which those registers were storing at the time point represented by the checkpoint. This approach avoids the need for checkpointing circuitry to have direct access to the processor registers, avoiding the disadvantages explained above. The particular context saving format defined architecturally can vary from one architecture to another, but in general, by having an agreed context saving format this simplifies the capture of the checkpoints because there is no need to include explicit identifying data identifying which register corresponds to each piece of saved data.

In response to the context switch, the checkpointing circuitry may be triggered to capture the register state of the outgoing context in a new checkpoint, in response to a signal issued by the given processor confirming that register state saving is complete for the first software process (the outgoing process which was executing before the context switch). For example, the given processor could send an acknowledgement message to the checkpointing circuitry once register saving is complete. In response to the signal from the given processor, the checkpointing circuitry can then save the contents of the mapped memory system locations (allocated for saving the register state according to the architecturally-defined context saving format) to the new checkpoint.

The saving of the register state (obtained by the checkpointing circuitry from the memory system locations corresponding to the mapped set of addresses) to form the new checkpoint takes place as background processing performed in the background of ongoing execution of the second software process at the given processor after the context switch, to avoid needing to delay the start of execution of the second software process while the checkpointing is being performed.

For capturing the memory-based context data associated with a given software process at the time of the context switch, one approach could be to scan a range of addresses in response to the context switch, to identify data that may have been modified by the outgoing first software process. However, this scanning may be inefficient and may delay servicing of cache accesses for the incoming second software process.

One approach to improve performance may be that the new checkpoint captured in response to the context switch may comprise a memory state difference snapshot indicative of updates made to data stored in memory by the first software process during a period when the first software process was active before the context switch. The memory state difference snapshot may be based on difference indications maintained on an ongoing basis during the execution of the first software process, so that each time that a software process writes data to a memory system location corresponding to an address for which checkpoints are to be maintained, a corresponding difference indication is updated so that at the time of a context switch then the latest values of the difference indications can be used to determine the data that changed while the first software process was executing. Tracking differences in memory state resulting from the execution of the first software process in the window running up the context switch can help to reduce the number of distinct addresses for which checkpoint data needs to be captured, as this may avoid the need to checkpoint data from addresses for which there has been no change in the memory data during that time window.

Hence, the checkpointing circuitry may maintain one or more memory state difference indications using a background process operating in the background of execution of the first software process. The background process updates a given memory state difference indication to track updates made to corresponding data by the first software process. In response to the context switch, the checkpointing circuitry captures, as the memory state difference snapshot of the new checkpoint, information indicative of current values of one or more memory state difference indications for which at least one update has been made to the corresponding data by the first software process.

In some examples, the memory state difference indications could be tracked in dedicated storage separate from the cache to which the first software processes writing data.

However, to avoid the need for modification to the hardware storage logic of the memory system itself, one approach can be to allocate certain cache lines in the memory address space as paired cache lines for tracking the memory state difference indication associated with another cache line. Hence, the checkpointing circuitry may maintain a given memory state difference indication, for indicating updates to data of a given cache line of a cache, in a paired cache line associated with the given cache line. By using a paired cache line (a further cache line designated for storing the difference indication for the given cache line) to track the difference between the value of a related cache line at a previous checkpoint and the latest value of that related cache line, this avoids the need for dedicated hardware storage logic for tracking the differences and makes it relatively efficient for the checkpointing circuitry to capture any updates to the context state of a given software process when a checkpoint needs to be taken. The address of the paired cache line could be an address designated by software (e.g. by setting configuration data used by the checkpointing circuitry to determine which cache line is the paired cache line).

The term "cache line" refers to a block of data (or, equivalently, a block of memory addresses in a memory address space) with a size corresponding to a single cache entry. That cache line does not necessarily need to be actually stored in a cache as the corresponding data in random access memory can also be referred as a cache line as it is of a size corresponding to a single cache entry. Hence, the difference tracking approach can also be used when data has been written back to memory from a cache.

The checkpointing circuitry may select which cache line is the paired cache line based on a paired cache line indicator associated with the given cache line, and in response to a context switch, the checkpointing circuitry may update the paired cache line indicator to switch which cache line is the paired cache line associated with the given cache line. Hence, separate difference indications can be maintained in different paired cache lines corresponding to the same related data cache line, to allow a number of different difference indications to be maintained for different software processes which may have written to the same cache line and so need separate checkpoints to be taken of the data in that data cache line at different time points. For example, a data cache line may be associated with a paired cache line indicator indicating which of multiple paired cache lines is the paired cache line to be used for currently tracking differences arising from updates to the related data cache line, and in response to a context switch the paired cache line indicator may be updated to point to the next paired cache line used to track the difference indication for the incoming software process to be executed after that context switch, so that any updates to the related data cache line made by that incoming software process will not affect the difference tracking indications maintained for the outgoing software process executed before the context switch. Hence, this enables the checkpointing circuitry to save off the checkpoint for the outgoing software process based on the difference tracking indications in paired cache lines which are not at risk of being overwritten by updates made by the incoming software process, as the incoming software process will cause updates to difference indications in different paired cache lines because of the switch of paired cache line triggered by the context switch.

In the case where new checkpoints are captured as a memory state difference snapshot indicating current values of one or more memory state difference indications for which at least one update has been made by the first software process since the previous checkpoint was taken, it can be particularly useful to perform the consolidation of multiple check points into a single consolidated checkpoint as discussed earlier. In this case, the consolidation may comprise replacing a number of difference-based checkpoints (each indicated as a difference with respect to the previous checkpoint) with a single consolidated checkpoint providing an absolute value for each of the checkpointed cache lines (as well as any captured register state). To perform the consolidation, the checkpointing circuitry may reference an earlier captured consolidated checkpoint for the same software process, to find out the absolute data values relative to which the first snapshot in the set of snapshots being consolidated indicated the difference indications.

It is not essential for a given checkpoint to cover the entire address space accessible to a given software process. In some cases, the checkpointing circuitry may be configurable by software to define which regions of the address space store data that requires checkpointing, and can omit saving of data updated in regions of address space that do not require checkpointing.

FIG. 1 illustrates, for comparison, a typical stop-based approach to checkpointing context state of software processes. As shown in the left hand side of FIG. 1, a number of software processes P1, P2, P3, P4 share the processing resource of a given processor on a time share basis (context switches are performed from time to time to switch between one process and another). At time τ shown in FIG. 1, process P3 is active and the other processes P1, P2, P4 are inactive. After elapse of a certain checkpoint interval CI (i.e. at time τ+CI), processing of the active software process P3 is stopped so that checkpointing software code can execute instead. Hence, at the time τ+CI none of the software processes P1 to P4 are making any forward progress. The checkpointing software code scans a memory address space to identify pages that were modified by the previously active software process P3. For example, this could be done using copy-on-write technique, in which when software process P3 starts execution for a given window of time after a previous checkpoint capture or context switch, all the pages accessible to software process P3 may initially be marked in page tables as read-only even if it is intended ultimately to allow software process P3 to write to those pages. The first time software process P3 attempts to write to a given page, the read-only permission causes a fault to be triggered, and the fault can cause an exception handler to execute to modify the access permission to be read/write, and optionally to record an indication of the given page in a tracking structure for tracking the pages accessed by software process P3. Hence, when the checkpointing software code executes, the checkpointing software code can either examine the page table structures to check which pages accessible to process P3 have become marked as read/write, or examine the tracking structure maintained by the software exception handler based on the copy-on-write technique (using a separate tracking structure from the page tables can be more efficient for the checkpointing software code to parse). Data from the memory pages found to have been modified by the process P3 can then be saved to a checkpoint data structure stored in memory, to act as a backup copy which could be restored if a hardware fault occurs which corrupts any context state associated with process P3.

However, a problem with this approach is that, as all of the software processes P1 to P4 are interrupted to allow the checkpointing software to capture the checkpoint, processing performance is reduced.

Figure 2:
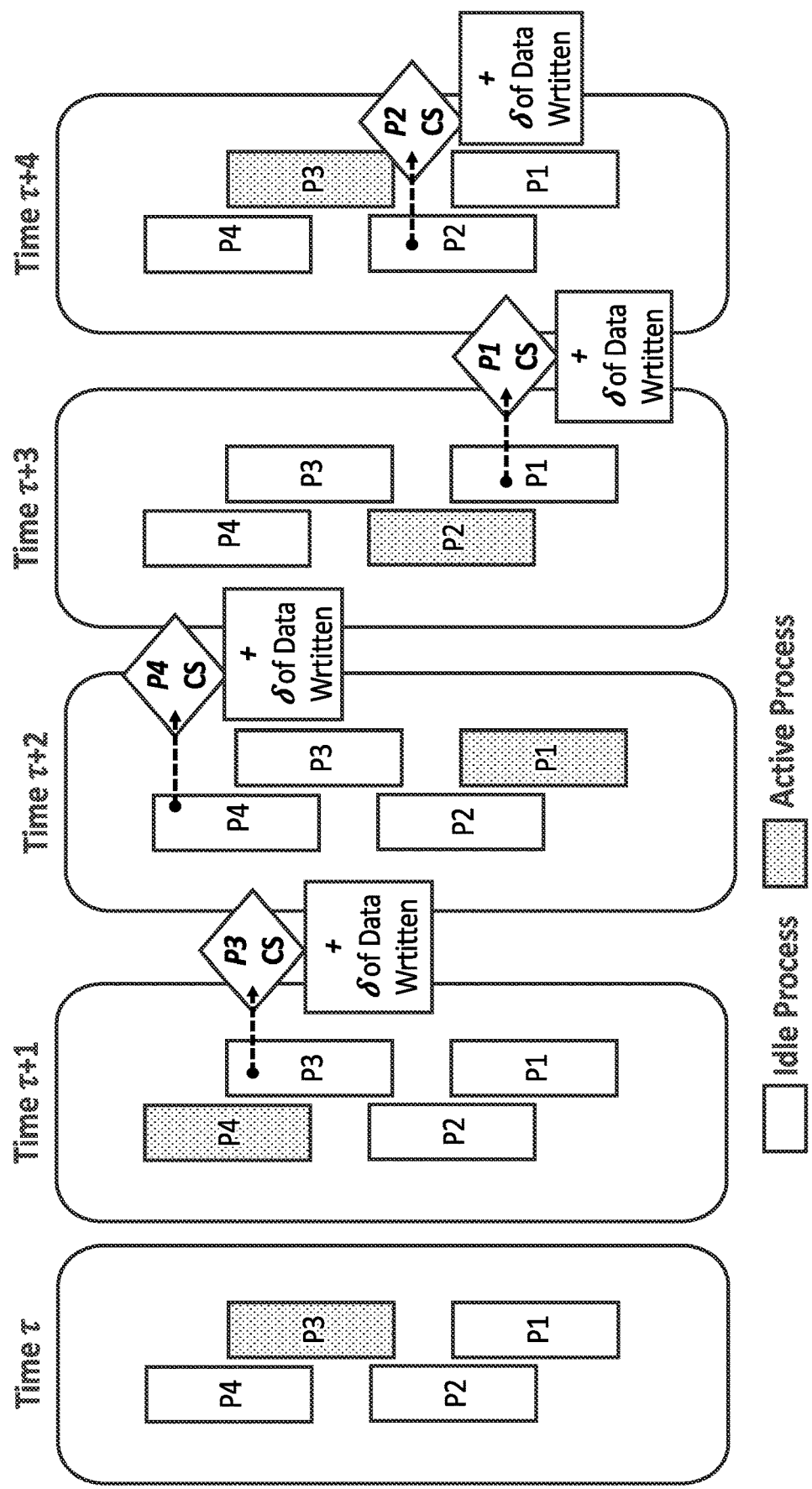
FIG. 2 illustrates an example of stop-free checkpointing where saving of checkpoints is performed in the background of execution of other software processes.

FIG. 2 illustrates stop-less checkpointing, which enables checkpointing of context state (including both register state and data written to memory) for a previously active software process in the background of execution of other software processes. This is enabled by providing checkpointing circuitry in hardware which performs hardware-triggered saving of the checkpoints while other software processes can continue execution on the processor cores.

Hence, as shown in FIG. 2, after a context switch at time τ+1 from processing software process P3 to software process P4, a checkpoint of the context state associated with the outgoing process P3 is saved by the checkpointing circuitry in parallel with ongoing execution of the newly active software process P4. Similarly, at time τ+2, when a context switch is performed from software process P4 to software process P1, a checkpoint of the context state associated with the outgoing process P4 is saved by the checkpointing circuitry, while the newly active software process P1 continues to execute. Similar saving of checkpoints of the context state of processes P1 and P2 are shown occurring at times τ+3 and τ+4. Hence, context snapshots are taken at units of certain time quanta which correspond to the time window for a context switch. Each captured context snapshot is saved to the memory system by the checkpointing circuitry as a background process running in parallel with the processor executing instructions from the new software process.

Figure 3:
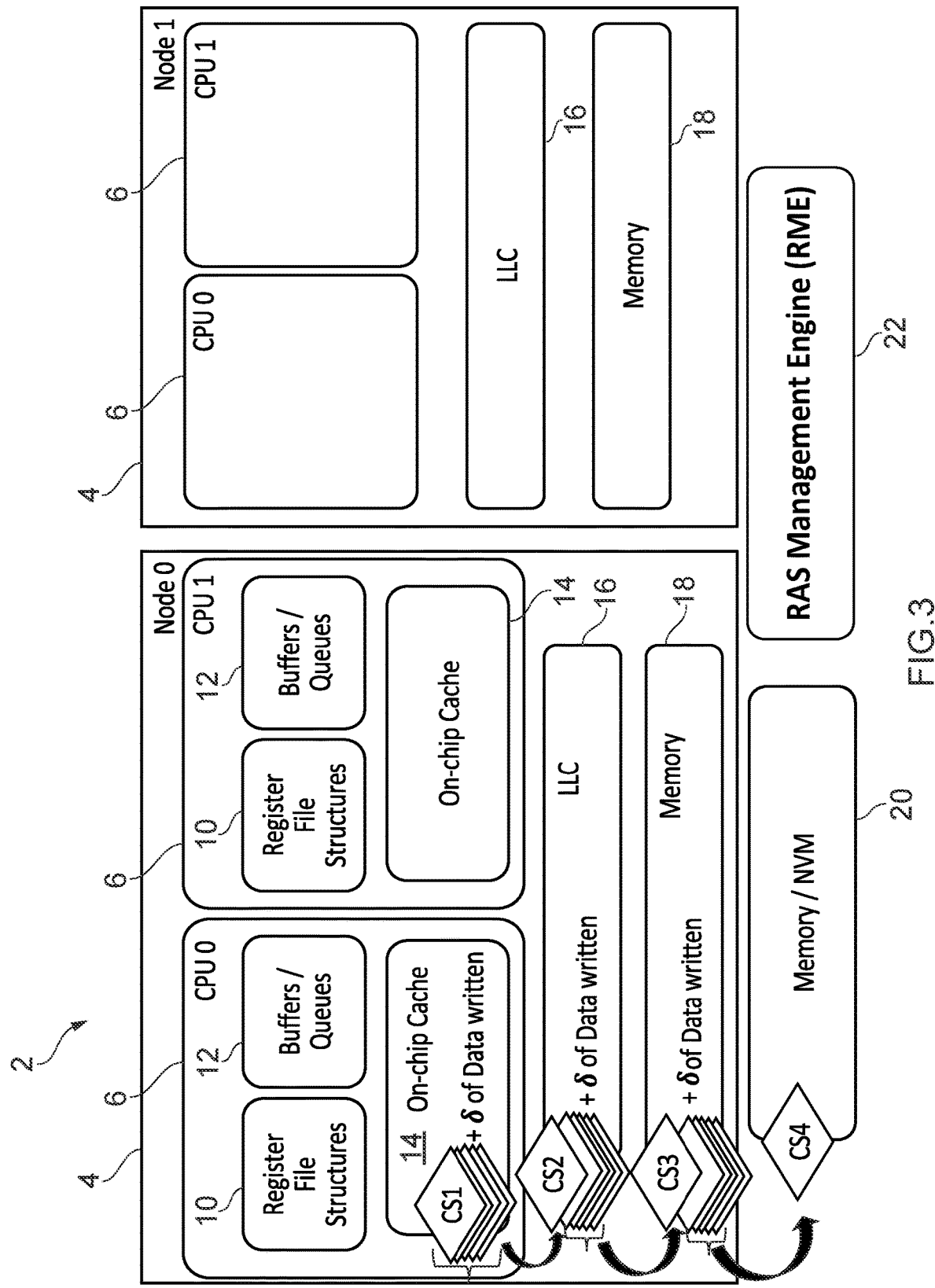
FIG. 3 illustrates an example of a data processing system having checkpointing circuitry, and schematically illustrates saving of a hierarchical set of checkpoints for a given software process.

FIG. 3 illustrates an example of a data processing system 2 comprising a number of processors 6 with access to a memory system comprising a number of hierarchical levels of memory storage. In this example, the data processing system 2 is a server-class system comprising one or more nodes 4 each comprising a number of processors 6. For example, each node 4 may be on a separate integrated circuit. While FIG. 3 shows two nodes 4, it will be appreciated that other examples could have just a single node 4 or more than two nodes 4. In this example, each processor 6 is a CPU (central processing unit), but it would also be possible for the system 2 to comprise other types of processor such as a GPU (graphics processing unit) or NPU (neural processing unit, which is a processor with hardware targeting acceleration of neural network processing or other machine learning algorithms). Again, while FIG. 3 shows each node 4 having two processors 6, other examples could provide a different number of processors 6 per node 4.

FIG. 3 illustrates a subset of the components of each processor 6, which may include register file structures 10 for storing register state (e.g. operands of instructions executed by the processor, results of the executed instructions, a program counter value indicating an instruction address of an instruction representing the current point of program flow reached during program execution, and control register state), a number of buffers or queue structures 12 for queueing load/store requests and associated data awaiting transfer to or from the memory system, and at least one on-chip cache 14. While not illustrated explicitly in FIG. 3, it will be appreciated that each processor may also have many other components including processing pipelines for decoding and executing instructions, a memory management unit for managing address translation and memory access control, prediction units such as branch predictors or prefetchers, etc. While FIG. 3 only illustrates the registers 10, buffers/queues 12 and on-chip cache 14 explicitly for the processors 6 in node 0, the processors 6 in node 1 may have similar components. It is not essential for all processors 6 to have the same design. It is possible to have heterogeneous processors which have different micro-architectural designs.

The memory system hierarchy includes a number of levels of memory storage including, in order of increasing distance from the execution logic of the processor 6, and hence in order of decreasing speed of access to data stored at each level:

the on-chip cache(s) 14 which are private to an individual processor 6—e.g. a level 1 cache, and possibly at least one further level of cache (e.g. level 2 or level 3 cache), which represent the fastest to access levels of the memory system hierarchy;

a last level cache (LLC) 16 shared between processors 6 within the same node 4, which is slower to access than the on-chip caches 14;

on-chip memory storage 18 within a particular node 4 (e.g. on-chip DRAM (Dynamic random access memory), on-chip SRAM (static random access memory), or any other form of on-chip memory), which is slower to access than the last level cache 16; and off-chip memory 20 shared between the nodes 4 (e.g. off-chip DRAM or off-chip non-volatile memory (NVM), such as Flash memory, phase change memory, ferroelectric RAM, magnetoresistive RAM, etc.), which is the slowest to access level of the memory system hierarchy.

It will be appreciated that the number of levels of memory system hierarchy could differ from that shown in FIG. 3.

Also shown in FIG. 3 is a RAS (Reliability, Availability and Safety) Management Engine (RME) 22 which acts as checkpointing circuitry to coordinate hardware-triggered stop-free saving of checkpoints of context state for software processes executing on the processors 6 of the system 2. While the RME 22 is shown as a single entity outside the processing nodes 4 for ease of understanding, in practice the RME may be implemented using distributed circuit logic which is implemented on-chip at a number of locations of each processor node 4 (e.g. including logic local to on-chip caches 14, memory controllers, or memory system fabric).

Another implementation of the RME can be a processor core 6 running a standalone thread performing the function of the RME, in the background of other functional threads executing on other cores. Hence, in some cases one of the cores 6 could be dedicated for the purpose of acting as the RME. Alternatively, the core 6 executing the RME thread may not be fixed, so the RME thread could migrate from core to core. Either way, the RME thread operates in the background of the other functional threads executing on other cores 6 to allow forward progress without stopping to perform checkpointing.

The RME 22 controls the capture of a hierarchical set of checkpoints of register state and data in memory which represents the execution context for a given software process. Sets of checkpoints may be maintained for multiple software processes, identified based on the process identifier of that software process. For a given software process, the hierarchical set of checkpoints includes checkpoints captured at different instances in time, and in general checkpoints for less recent instances in time are gradually propagated through to the slower-to-access levels of the memory system so that the more recent instances in time are stored at a higher level of the memory hierarchy closer to the processor 6.

For example, as shown in FIG. 3, for a given software process, a number of snapshots of register state CS1 and memory data (corresponding to different time points) are captured in the on-chip cache 14 initially.

For example, at a context switch, software would normally save the register state of the outgoing software process to memory to preserve it in case the incoming software process overwrites the registers. To enable the RME 22 to detect this writeback of register state and capture it in a checkpoint in a software-independent format which permits the register state to later be restored to the register file structures 10 in a way which restores each individual data item to the correct register, an architected format may be defined for saving the register state context in memory. For example, the set of architectural registers defined for a given software process may be mapped to a corresponding set of mapped physical addresses in memory (e.g. registers r1-r8 may map to a certain set of physical addresses, PA 0x101- 108, say). This means that an external privileged agent (the RME 22) is able to flush copy the register contents from the mapped set of physical addresses to a region of the memory address space allocated for storing the checkpoint, without needing to understand the particular software-specific manner with which a software component would save register state to memory if there was no architecturally-defined format. To enable the RME 22 to detect when saving of register state to memory for an outgoing software process has completed so that the checkpoint for the outgoing software process can now be captured, the processor 6 may send a register saving completion signal to the RME 22 to confirm when register saving is complete after a context switch.

To enable capture of the memory-based context data for a given software process, a difference-based background process may be used where, as a given software process executes, each time the software process writes to a given cache line of data, a corresponding update may also be made to an associated paired cache line which tracks the difference between the given cache line's data at the start of the window of time and the latest value of the given cache line's data. Hence, when a new snapshot of memory-based context data needs to be captured for a given software process, the relevant paired cache lines associated with the data cache lines used by that software process can be saved to a checkpoint structure stored in memory (e.g. within the on-chip cache storage).

From time to time (e.g. at intervals of a predetermined number of context switches), the RME 22 may perform actions to consolidate a number of separately captured checkpoints into a smaller number of checkpoints at a coarser granularity of time resolution (e.g. multiple checkpoints for a number of different timepoints may be compressed into a single checkpoint corresponding to a single time point). For example, a number of separate difference indications capture for different times may be compressed into a single difference indication or an absolute value of the data stored for particular cache lines. Similarly, the latest snapshot of register state may be retained for a given compressed checkpoint, and other snapshots of register state indicated in the original set of checkpoints may be discarded. Hence, over time the granularity with which checkpoints are maintained for different time points may become less fine-grained.

Also, the RME 22 may propagate the checkpoints captured at a given level of the memory system hierarchy down to lower levels of the memory system hierarchy which are slower to access. This may be done at the same time as consolidating multiple checkpoints into a smaller number of checkpoints. For example, when a checkpoint consolidation event occurs (e.g. the elapse of a certain number of context switches), then the compressed checkpoint, which was derived from combining multiple checkpoints stored at a given level of the memory system hierarchy, may be written to be stored in the next level of the memory system hierarchy. For example, as shown in FIG. 3, multiple checkpoints CS1 for the same software process stored in the on-chip cache 14 may be combined to form a single checkpoint CS2 stored in the LLC 16; multiple checkpoints CS2 for the same software process stored in the LLC 16 may be combined to form a single checkpoint CS3 stored in the on-chip memory 18; and multiple checkpoints CS3 for the same software process stored in the on-chip memory 18 may be combined to form a single checkpoint CS4 stored in the off-chip memory.

Hence, over time the RME 22 controls the checkpoints for a given software process to trickle down through the memory system hierarchy so that there are a wide range of options available for restoring context state for a given software should a hardware error (e.g. a RAS error) occur. RAS errors (e.g. single bit or multi bit errors caused by particle strikes) may be detected by any known error detection technique, e.g. using error detecting/correcting codes or lockstep redundant components. The RME 22 may maintain checkpoint tracking data structures (e.g. stored in the memory system) tracking the addresses at which particular checkpoints corresponding to a particular moment in time are saved for a given software process. For example, the RME 22 may associate each checkpoint with a process identifier identifying the corresponding software process and a timestamp value identifying the corresponding moment in time. Hence, when a hardware error is detected at a given level memory system hierarchy, the RME 22 can determine which is the most suitable checkpoint to restore based on the location at which the error was detected.

FIG. 4 is a flow diagram illustrating a method of capturing checkpoints. At step 100, software processes are executed using at least one processor 6. At step 102, data is stored in a memory system 14, 16, 18, 20 for access by the at least one processor 6. At step 104, checkpointing circuitry 22 triggers saving to the memory system 14, 16, 18, 20 of context state associated with at least one software process executed by the at least one processor. The saving is a background process performed by the checkpointing circuitry 22 in the background of execution of the software processes executing on the at least one processor 6. In the example of FIG. 3, the saving is hardware-managed by the RME 22, but other examples could execute checkpointing software on one of the processors 6 or on a separate microcontroller, to provide software-managed checkpointing in the background of execution of software processes running on other processors 6.

FIG. 5 is a flow diagram showing a method of responding to a context switch. At step 120 a context switch occurs on a given processor 6, to switch between processing of an outgoing software process and processing of an incoming software process. The occurrence of the context switch is signalled by a hardware-exposed context switch signal sent to or from the checkpointing circuitry 22. The context switch signal could be a signal sent from the processor 6 to the checkpointing circuitry 22 to inform the checkpointing circuitry 22 that a context switch has occurred, or could be signal sent from the checkpointing circuitry 22 to the processor 6 to instruct that the processor 6 should switch between contexts. Some implementations could support a combination of these approaches where in general the processor 6 (or software executing on the processor) may be responsible for determining the timing of context switches, but the checkpointing circuitry 22 may monitor the time since the previous context switch and if this time exceeds a certain limit, then the checkpointing circuitry 22 may trigger a context switch for the purpose of enabling a checkpoint to be captured. For example, be context switch triggered by the checkpointing circuitry 22 can be a "dummy" context switch for which the incoming software process is actually the same as the outgoing software process, so that the saving of register state to memory is performed for the sole purpose of enabling a checkpoint to be captured, even though the outgoing software process may continue after the context switch. Alternatively, context switches may be forced to occur at certain regular time intervals and in this case there may be no need to trigger a dummy context switch. Also, it is possible that the timing of context which is may be controlled by an external agent separate from both the processor 6 and the checkpointing circuitry 22. In an embodiment which performs software-managed checkpointing in the background of process execution, the software could be informed of the timing of a context switch by writing to a certain memory address designated for representing an indication that a context switch has occurred.

Regardless of how the context switch is triggered, at step 122, the checkpointing circuitry 22 determines that a context switch has occurred and in response captures a new checkpoint of the latest register state of the outgoing software process and data stored to memory by the outgoing software process in the period since the last context switch. As discussed earlier, this may be carried out by copying the saved register state from a set of mapped addresses to which the processor 6 saves the outgoing processes register state according to an architected context saving format, and by capturing the latest set of difference indications maintained in paired cache lines for a corresponding set of data cache lines (see FIG. 7 discussed below).

FIG. 6 is a flow diagram illustrating restoration of a given checkpoint. At step 130 the checkpointing circuitry 22 detects that a hardware error has occurred affecting the context data for a given software process. In response to the hardware error, at step 132 the checkpointing circuitry 22 selects a particular checkpoint associated with a given software process, based on the location of the hardware error and checkpoint tracking data maintained by the checkpointing circuitry 22 to track the locations of the checkpoints saved for different timestamp values for the given software process. At step 134 the checkpointing circuitry restores the selected checkpoint, by restoring the memory-based state of the given software process based on the captured memory data of the selected checkpoint, and restoring the register state of the given software process. The register state can be restored by the checkpointing circuitry 22 restoring the checkpointed values of register state to the set of mapped addresses in memory allocated for representing the register context state of the given software process. When execution of the given software process later resumes, the given software process can execute load instructions to read its register state back in from the mapped set of addresses according to the architecturally-defined register state saving format (with an understood mapping between the relative position of a data value within the mapped set of addresses and the particular architectural register whose data is to be restored based on that data value). This approach avoids the need for checkpointing circuitry 22 to have direct access to the processor registers, which enables the checkpointing technique to work with existing processor designs without modifying the circuit logic of the processor 6.

FIG. 7 illustrates an example of the use of paired cache lines to track differences between the memory-based data for a given software process at the start of a time window of execution and the end of the time window when a checkpoint is taken. Here, the term "cache line" is used to denote a block of data of a given size corresponding to one cache entry of the cache. The cache line can also be understood as the unit of data which forms the basic unit of data transfer between different levels of the memory system hierarchy. Hence, a cache line of data does not necessarily need to be currently stored in a cache and could also be stored in on-chip memory 18 or off-chip memory 20. Regardless of the current location of the data, for a given data cache line 150, an associated cache line 152 (indicated as the next cache line in the address space in FIG. 7, although it could also be non-adjacent to the data cache line 150) is designated as a paired cache line used to track the difference indication for the corresponding data cache line 150. Hence, each time a given software process writes to the data cache line 150, the checkpointing circuitry 22 triggers a write to the corresponding paired cache line 152 (which could be present in the cache 14, 16 or may need to be brought into the cache if not already in the cache) so that the difference indication in the paired cache line 152 tracks the difference between the latest value of the data cache line 150 and the value which that data cache line 150 had at the start of the current window of processing since the previous checkpoint was taken.

When a checkpoint is taken on a context switch, to prevent the incoming software process overwriting the difference indication captured for the outgoing software process in the paired cache line before a checkpoint can be taken, while avoiding the need to delay execution of the incoming software process, a paired cache line identifier 154 can be updated to switch which other cache line is the paired cache line for the given data line 150, and then difference updates in response to writes to the data cache line 150 by the incoming software process may then take place in another paired line 156 as indicated by the updated paired line identifier 154. For example, the paired line identifier 154 could be represented by a number of upper bits of the data cache line 150. Hence, this enables the checkpointing circuitry 22 to save off the difference indication stored in the previous paired cache line 152 in the background of continued processing of the incoming software process which could update the new paired cache line 156 if the incoming software process also writes to cache line 150. This use of paired cache lines to track differences can make context saving more efficient because if any of the difference indications 152 for a set of data cache lines 150 to be checkpointed indicates that there is no difference since the previous checkpoint, then it is not necessary to save state for these cache lines to a new checkpoint and instead the checkpoint can indicate that these cache lines 150 had not changed since the previous checkpoint.

Hence, in one example, context snapshots are taken following the end of each time quantum (time-window for a context switch). At the expiry of each quantum, the checkpointing function is managed by the RME 22. An example process for capturing the memory state for a given checkpoints is that:

- A "diff" (difference indication) for each cache line 150 to be checkpointed is saved/processed by RME 22 at each checkpoint timing.
- Cache lines 150 can have a "pair" cache line 152 allocated to maintain the "diff" (e.g., use N upper bits as "pair" indicator address 154—the address hash used for determining which cache set to access for that paired line 152 should not conflict with the hash of the parent cache line 150, to make it more likely both the data cache line 150 and diff cache line 152 can be co-resident in a cache). The pair indicator 154 can be incremented on each checkpoint, and all other "diff" bits can be reset to 0 at each checkpoint after saving the previous value.
- The memory writes during the quantum of process runtime are tracked using the "diff" indications and a new checkpoint is constructed from "possibly modified" "diff" cache lines 152 that have been updated during that quantum.
- On a "heartbeat" timing (e.g. every N time quanta), the "diffs" for a given software process can be flushed to the next level of the memory system hierarchy and/or consolidated into fewer checkpoints.
- A time stamp value is attached to each context snapshot representing the quantum of time represented by the snapshot.

FIG. 8 is a flow diagram showing maintenance of difference indications in paired cache lines. At step 200 store operation is executed by a given software process. In response, at step 202, data in a given cache line 150 having an address specified by the store operation is updated based on the store data specified by the store operation. In response to detecting the store operation, at step 204 the checkpointing circuitry 22 also maintains a memory state difference indication in a paired cache line 152 associated with the data cache line 150, to track the update made to the given cache line (e.g. by setting the paired cache line to the difference between the value of the data cache line 150 at the previous checkpoint capture timing and the updated value written to the cache line by the store operation at step 202).

FIG. 9 is a flow diagram showing steps performed in response to a context switch in an embodiment which uses the paired cache line approach to track memory state updates for a given software process. At step 210 the context switch occurs, which can be detected by the checkpointing circuitry using any of the techniques discussed above for step 120 of FIG. 5. At step 212, in response to the context switch the processor 6 that was executing the outgoing software process writes the register state for the outgoing software process in an architecturally-defined format to a set of addresses mapped for storing the register context for the outgoing software process. Step 212 could be performed by hardware circuit logic within the processor 6, or could be triggered by software instructions, for example instructions of supervisory code which manages the context switch or instructions of the incoming software process to be executed after the context switch. At step 214, the checkpointing circuitry 22 captures a new checkpoint comprising a snapshot of the register state obtained from the memory system locations corresponding to the mapped addresses (once the processor 6 has confirmed that the saving of the register state to the mapped set of addresses has completed), and a snapshot of updated memory data for the outgoing software process, which is determined based on the current value of one or more memory state difference indications stored in the paired cache lines 152 corresponding to a set of data cache lines 150 to be checkpointed. The new checkpoint is saved in association with a process identifier identifying the outgoing software process and a timestamp indicating the point in time represented by the checkpointed context state. The checkpointing circuitry 22 updates its checkpoint tracking structure to track the location in the memory system at which the checkpoint is saved.

Figure 10:
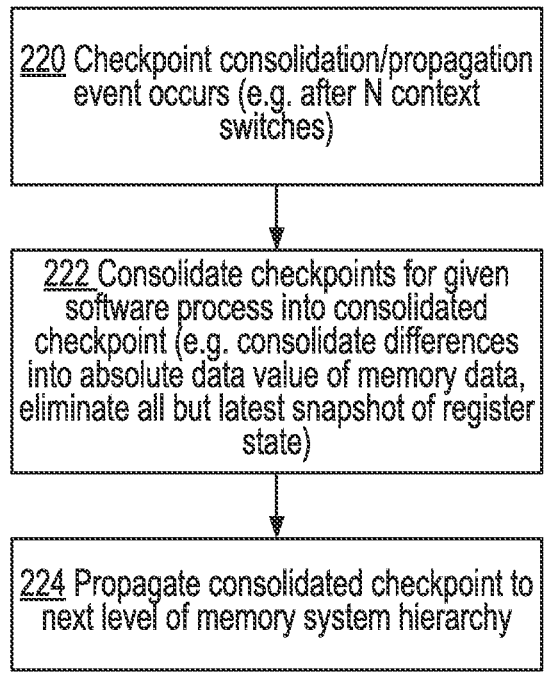
FIG. 10 illustrates steps performed in response to a checkpoint consolidation/propagation event.

FIG. 10 is a flow diagram showing steps to consolidate checkpoints and propagate the consolidated checkpoint to the next level of the memory system hierarchy. At step 220 a checkpoint consolidation/propagation event occurs (e.g. this could be detected after a certain number N of context switches (each triggering the steps shown in FIG. 9) have occurred since the previous checkpoint consolidation/propagation event). In response to the checkpoint consolidation/propagation event, at step 222 the checkpointing circuitry consolidates multiple checkpoints for the given software process corresponding to different points in time into a consolidated checkpoint. For example, a number of difference indications captured at different points in time may be consolidated into an absolute data value of corresponding memory data (by applying the indicated difference indications to an earlier absolute value of memory data for a previous consolidated checkpoint, or to a default value (e.g.

zero) if no previous consolidated checkpoint exists). All but the latest snapshot of register state may be eliminated from the consolidated checkpoint. At step 224, the consolidated checkpoint is propagated to the next level of the memory system hierarchy (e.g. by triggering a cache writeback operation or other operation to force writeback of state from a faster-to-access to a slower-to-access level of the memory system hierarchy).

While FIG. 10 shows an example in which both the consolidation of checkpoints and the propagation to the next level of memory system hierarchy occur in response to the same event, other examples could trigger propagation to the next level of the memory system hierarchy separately from the consolidation of multiple checkpoints into a compressed form.

Hence, in summary a methodology is provided for cost-effective fault tolerance in server-class systems or other data processing systems. In such systems, single-bit and multi-bit faults may occur in the components of any node 4 of the system 2, and so data anywhere in the node 4 can become unrecoverable, causing execution of threads to fail and become unrecoverable. Processor cores 6 can also fail, leading to inaccessible memory. To provide fault tolerance against such hardware errors, a hardware-supported check-pointing mechanism is provided that saves execution state (and associated memory data) of the executed processes. This method allows for fine-grained and multi-level check-pointing of the application execution state. Periodic snapshots of the executed thread are incrementally updated and promoted to slower-to-access levels of memory, for recovery from failures in the node's components 6, 16, 18 and/or the node 4 as a whole. The RME 22 is tethered to the memory system network traffic and is provided as an independent structure, an upgraded memory controller, or as distributed circuit logic, and has the ability to trigger generation of snapshots at a synchronous time quanta and the ability to monitor data traffic and generate data-"diffs" (difference values) to store with the checkpoint state. This enables recovery using a saved snapshot of the context-state which is consistent with the stored data accessed by that context. In the case of shared data shared between processes according to a coherency protocol implemented by the memory system, consistently stored snapshots of associated processes are recovered together, so a domino effect is possible here. Advantages include that stop-less checkpointing enables cost-free forward error-free execution; the fine-grained hierarchical checkpointing method allows for error-containment; the technique enables distributed checkpointing and memory tracking through background processes; and the technique does not require modification of the processor cores 6, as checkpointing can be handled by the hardware component 22 added within the memory system. To support the checkpointing technique, it can be useful that the checkpointing circuitry 22 has ability to monitor context swaps/migrations in system from the hardware layer (either the hardware dispatches the context switches, or the operating system executing on the processor 6 notifies the hardware of swaps/migrations). Also, it can be useful for the registers 10 to be mapped to a memory back-end structure which has an architecturally understood format.

It will be appreciated that other implementations could use a separate tracking structure to track the addresses of cache lines modified by software during a given window between context switches, so the use of paired cache lines is not essential.

Figure 11:
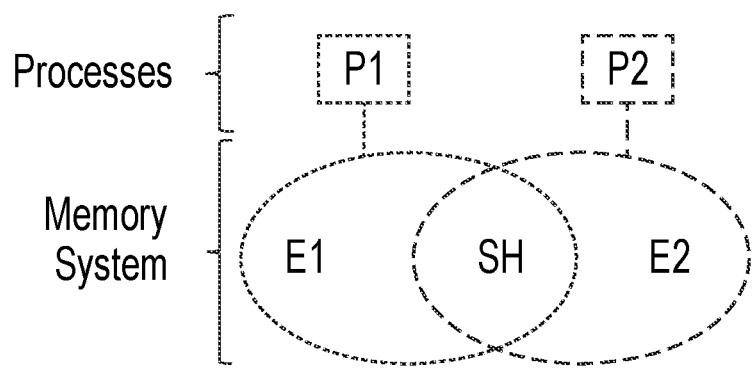
FIG. 11 illustrates sharing of data between software processes.

As mentioned above, when a checkpoint captured for a given software process includes coherently stored data shared with another software process, restoring the checkpoint for the given software process may also make the coherently stored data available for the other software process. For example, FIG. 11 shows two processes P1 and P2 which each access exclusive data E1 and E2 respectively and also access the shared data SH (i.e. P1 has access to E1 and SH but not E2, and P2 has access to E2 and SH but not E1). When checkpointing, creation of the memory snapshot, data diffs, and checkpoint states for each process includes all the memory accessed by each process. In addition to the respective exclusive data, the shared data 'SH' is considered during checkpoint state generation for each process. Each checkpoint is recorded along with its respective time quanta. The checkpoints stored for each of the processes P1 and P2 are appropriately tagged to denote their access to shared data. When recovery is triggered upon an unrecoverable error on either process (P1 or P2), recovery can be triggered for both, synchronized to the checkpoint state at the same time-quanta. In order to recreate the memory state using the diffs stored (intermediate checkpoints stored in nearer memory), the diffs can be replayed in the reverse-order of their respective quanta time stamps. In the case of the recreating shared data, memory consistency can be ensured by replaying the memory segments of each process, including the shared data accessed by each process, while respecting the respective time-stamps of each copy of the shared data.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Further examples are set out in the following clauses:
1. An apparatus comprising:
   at least one processor to execute software processes;
   a memory system to store data for access by the at least one processor; and
   checkpointing circuitry to trigger saving, to the memory system, of checkpoints of context state associated with at least one software process executed by the at least one processor; in which:
   said saving of checkpoints is a background process performed by the checkpointing circuitry in the background of execution of the software processes by the at least one processor.
2. The apparatus according to clause 1, in which the checkpointing circuitry comprises hardware circuitry capable of initiating, unprompted by a memory access request made by software executing on said at least one processor, a memory access request requesting a read, write or transfer of data at a given location of the memory system.
3. The apparatus according to any of clauses 1 and 2, in which the checkpointing circuitry is configured to maintain tracking data indicative of one or more locations at which checkpoints of context state are stored for a given software process.
4. The apparatus according to any preceding clause, in which the checkpointing circuitry is configured to restore a given checkpoint in response to a hardware error signal indicating occurrence of a hardware error.
5. The apparatus according to any preceding clause, in which the checkpointing circuitry is configured to trigger saving of a hierarchical set of checkpoints, the hierarchical set of checkpoints comprising a plurality of checkpoints at a plurality of different time points, where the checkpointing circuitry is configured to control the plurality of checkpoints to be stored to at least two different levels of memory system hierarchy.
6. The apparatus according to clause 5, in which the checkpointing circuitry is configured to maintain the hierarchical set of checkpoints to store a checkpoint corresponding to a less recent time point at a level of the memory system hierarchy which is slower to access than a level of the memory system hierarchy used to store a checkpoint corresponding to a more recent time point.
7. The apparatus according to any preceding clause, in which in response to a checkpoint consolidation trigger event, the checkpointing circuitry is configured to trigger a checkpoint consolidation operation to consolidate a plurality of checkpoints corresponding to different time points for a given software process, to form a consolidated checkpoint for the given software process.
8. The apparatus according to clause 7, in which the checkpointing circuitry is configured to write the consolidated checkpoint to a level of the memory system hierarchy which is slower to access than a level of the memory system hierarchy used to store the plurality of checkpoints.
9. The apparatus according to any preceding clause, in which the checkpointing circuitry is configured to capture checkpoints for a plurality of different software processes, each checkpoint associated with a process identifier indicative of a corresponding software process.
10. The apparatus according to any preceding clause, in which a checkpoint for a given software process comprises both register state and data stored to memory by the given software process.
11. The apparatus according to any preceding clause, in which, when a checkpoint captured for a given software process includes coherently stored data shared with another software process, restoring the checkpoint for the given software process also makes the coherently stored data available for the other software process.
12. The apparatus according to any preceding clause, in which, in response to a context switch at a given processor to switch from processing a first software process to processing a second software process, the checkpointing circuitry is configured to trigger saving of a new checkpoint for the first context.
13. The apparatus according to clause 12, in which the checkpointing circuitry is configured to use a hardware-exposed context switch signal to identify a timing at which the context switch occurs.
14. The apparatus according to any of clauses 12 and 13, in which in response to the context switch, the at least one processor is configured to save register state for the first software process, according to an architecturally-defined context saving format, to memory system locations corresponding to a mapped set of addresses mapped for storing the register state for the first software processes, and the new checkpoint comprises the saved register state obtained by the checkpointing circuitry from the memory system locations corresponding to the mapped set of addresses.
15. The apparatus according to any of clauses 12 to 14, in which the new checkpoint comprises a memory state difference snapshot indicative of updates made to data stored in memory by the first software process during a period when the first software process was active before the context switch.
16. The apparatus according to clause 15, in which the checkpointing circuitry is configured to maintain one or more memory state difference indications using a background process operating in the background of execution of the first software process, the background process updating a given memory state difference indication to track updates made to corresponding data by the first software process; and in response to the context switch, the checkpointing circuitry is configured to capture, as the memory state difference snapshot of the new checkpoint, information indicative of current values of one or more memory state difference indications for which at least one update has been made to the corresponding data by the first software process.

17. The apparatus according to clause 16, in which the checkpointing circuitry is configured to maintain a given memory state difference indication, for indicating updates to data of a given cache line of a cache, in a paired cache line associated with the given cache line.

18. The apparatus according to clause 17, in which the checkpointing circuitry is configured to select which cache line is the paired cache line based on a paired cache line indicator associated with the given cache line; and in response to a context switch, the checkpointing circuitry is configured to update the paired cache line indicator to switch which cache line is the paired cache line associated with the given cache line.

19. A method comprising:
executing software processes using at least one processor;
storing data in a memory system for access by the at least one processor; and
triggering saving, to the memory system, of checkpoints of context state associated with at least one software process executed by the at least one processor; in which:
said saving of checkpoints is a background process performed by checkpointing circuitry in the background of execution of the software processes by the at least one processor.

20. A computer-readable medium to store computer-readable code for fabrication of an apparatus comprising:
at least one processor to execute software processes;
a memory system to store data for access by the at least one processor; and
checkpointing circuitry to trigger saving, to the memory system, of checkpoints of context state associated with at least one software process executed by the at least one processor; in which:
said saving of checkpoints is a background process performed by the checkpointing circuitry in the background of execution of the software processes by the at least one processor.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
at least one processor to execute software processes;
a memory system to store data for access by the at least one processor; and
checkpointing circuitry to trigger saving, to the memory system, of checkpoints of context state information associated with at least one software process executed by the at least one processor; in which:
said saving of checkpoints is a background process performed by the checkpointing circuitry in a background of execution of the software processes by the at least one processor; and
in response to a context switch at a given processor to switch from processing a first software process to processing a second software process, the checkpointing circuitry is configured to trigger saving of a new checkpoint for the first software process.

2. The apparatus according to claim 1, in which the checkpointing circuitry comprises memory access circuitry capable of initiating, unprompted by a memory access request made by software executing on said at least one processor, a memory access request requesting a read, write or transfer of data at a given location of the memory system.

3. The apparatus according to claim 1, in which the checkpointing circuitry is configured to maintain tracking data indicative of one or more locations at which the checkpoints of the context state information are stored for a given software process.

4. The apparatus according to claim 1, in which the checkpointing circuitry is configured to restore a given checkpoint in response to a hardware error signal indicating occurrence of a hardware error.

5. The apparatus according to claim 1, in which the checkpointing circuitry is configured to trigger saving of a hierarchical set of checkpoints, the hierarchical set of checkpoints comprising a plurality of checkpoints at a plurality of different time points, wherein the checkpointing circuitry is configured to control the plurality of checkpoints to be stored to at least two different levels of memory system hierarchy.

6. The apparatus according to claim 5, in which the checkpointing circuitry is configured to maintain the hierarchical set of checkpoints to store a checkpoint corresponding to a less recent time point at a level of the memory system hierarchy which is slower to access than a level of the memory system hierarchy used to store a checkpoint corresponding to a more recent time point.

7. The apparatus according to claim 1, in which in response to a checkpoint consolidation trigger event, the checkpointing circuitry is configured to trigger a checkpoint consolidation operation to consolidate a plurality of checkpoints corresponding to different time points for a given software process, to form a consolidated checkpoint for the given software process.

8. The apparatus according to claim 7, in which the checkpointing circuitry is configured to write the consolidated checkpoint to a level of a memory system hierarchy which is slower to access than a level of the memory system hierarchy used to store the plurality of checkpoints.

9. The apparatus according to claim 1, in which the checkpointing circuitry is configured to capture checkpoints for a plurality of different software processes, each checkpoint associated with a process identifier indicative of a corresponding software process.

10. The apparatus according to claim 1, in which a checkpoint for a given software process comprises both a register state and data stored to memory by the given software process.

11. The apparatus according to claim 1, in which, when a checkpoint captured for a given software process includes coherently stored data shared with another software process, restoring the checkpoint for the given software process also makes the coherently stored data available for the other software process.

12. The apparatus according to claim 1, in which the checkpointing circuitry is configured to use a hardware-exposed context switch signal to determine a timing at which the new checkpoint is to be saved.

13. The apparatus according to claim 1, in which in response to the context switch, the at least one processor is configured to save a register state for the first software process, according to an architecturally-defined context saving format, to memory system locations corresponding to a mapped set of addresses mapped for storing the register state for the first software process, and
the new checkpoint comprises the saved register state obtained by the checkpointing circuitry from the memory system locations corresponding to the mapped set of addresses.

14. The apparatus according to claim 1, in which the new checkpoint comprises a memory state difference snapshot indicative of updates made to data stored in memory by the first software process during a period when the first software process was active before the context switch.

15. The apparatus according to claim 14, in which the checkpointing circuitry is configured to maintain one or more memory state difference indications using a background process operating in a background of execution of the first software process, the background process updating a given memory state difference indication to track updates made to corresponding data by the first software process; and
in response to the context switch, the checkpointing circuitry is configured to capture, as the memory state difference snapshot of the new checkpoint, information indicative of current values of one or more memory state difference indications for which at least one update has been made to the corresponding data by the first software process.

16. The apparatus according to claim 15, in which the checkpointing circuitry is configured to maintain a given memory state difference indication, for indicating updates to data of a given cache line of a cache, in a paired cache line associated with the given cache line.

17. The apparatus according to claim 16, in which the checkpointing circuitry is configured to select which cache line is the paired cache line based on a paired cache line indicator associated with the given cache line; and
in response to a context switch, the checkpointing circuitry is configured to update the paired cache line indicator to switch which cache line is the paired cache line associated with the given cache line.

18. A method comprising:
executing software processes using at least one processor;
storing data in a memory system for access by the at least one processor; and
triggering saving, to the memory system, of checkpoints of context state information associated with at least one software process executed by the at least one processor; in which:
said saving of checkpoints is a background process performed by checkpointing circuitry in a background of execution of the software processes by the at least one processor; and
in response to a context switch at a given processor to switch from processing a first software process to processing a second software process, triggering saving of a new checkpoint for the first software process.

19. A non-transitory computer-readable medium to store computer-readable code for fabrication of an apparatus comprising:
at least one processor to execute software processes;
a memory system to store data for access by the at least one processor; and
checkpointing circuitry to trigger saving, to the memory system, of checkpoints of a context state information associated with at least one software process executed by the at least one processor; in which:
said saving of checkpoints is a background process performed by the checkpointing circuitry in a background of execution of the software processes by the at least one processor; and
in response to a context switch at a given processor to switch from processing a first software process to processing a second software process, the checkpointing circuitry is configured to trigger saving of a new checkpoint for the first software process.

* * * * *